US 11,298,766 B2

(12) United States Patent
Shirai (10) Patent No.: US 11,298,766 B2
(45) Date of Patent: Apr. 12, 2022

(54) CONTROL DEVICE FOR WIRE ELECTRIC DISCHARGE MACHINE (71) Applicant: FANUC CORPORATION, Yamanashi (JP)

(72) Inventor: Kenichiro Shirai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 421 days.

(21) Appl. No.: 16/437,145

(22) Filed: Jun. 11, 2019

(65) Prior Publication Data
US 2020/0001384 A1 Jan. 2, 2020

(30) Foreign Application Priority Data

Jun. 29, 2018 (JP) .............................. JP2018-124900

(51) Int. Cl.
*B23H 7/06* (2006.01)
*B23H 7/20* (2006.01)
*B23H 7/08* (2006.01)

(52) U.S. Cl.
CPC .............. *B23H 7/065* (2013.01); *B23H 7/08* (2013.01); *B23H 7/20* (2013.01); *G05B 2219/45043* (2013.01)

(58) Field of Classification Search
CPC . B23H 7/065; B23H 7/08; B23H 7/20; G05B 2219/45043; G05B 2219/36504
See application file for complete search history.

(56) References Cited

U.S. PATENT DOCUMENTS

| 5,418,344 | A | * | 5/1995 | Magara | ................. | B23H 7/065 |
| | | | | | | 219/69.12 |
| 2013/0238114 | A1 | * | 9/2013 | Hiraga | ................. | G05B 13/021 |
| | | | | | | 700/193 |
| 2015/0239055 | A1 | * | 8/2015 | Niu | ........................ | B23H 1/02 |
| | | | | | | 219/69.12 |

FOREIGN PATENT DOCUMENTS

| JP | 59115125 A * | 7/1984 | ............. B23H 7/065 |
| JP | H04-217426 A | 8/1992 | |

(Continued)

OTHER PUBLICATIONS

An Office Action mailed by the Japanese Patent Office dated May 19, 2020, which corresponds to Japanese Patent Application No. 2018-124900 and is related to U.S. Appl. No. 16/437,145.

(Continued)

*Primary Examiner* — Geoffrey S Evans
(74) *Attorney, Agent, or Firm* — Studebaker & Brackett PC (57) ABSTRACT

A control device for a wire electric discharge machine includes: a shape analysis portion which looks ahead a machining program, and analyzes a machined shape of a workpiece; a machining path creation portion which creates machining paths of identical circular arc shape offsetting from a machined shape analyzed, wherein the offset value differs for the machining paths, and shape of a corner part are identical circular arc shape; a machining path creation portion which creates machining paths of concentric circle shape offsetting from a machined shape analyzed, wherein the offset value differs for the machining paths, and shape of a corner part are concentric circle shape; and a machining path selection portion which selects either of the machining paths of identical circular arc shape and concentric circle shape, based on at least one among the machining program, (Continued)

machined shape analyzed, and the machining paths of identical circular arc shape and concentric circle shape.

5 Claims, 5 Drawing Sheets

(56) References Cited

FOREIGN PATENT DOCUMENTS

| JP | H07-009261 A | 1/1995 |
|----|--------------|--------|
| JP | H08-168925 A | 7/1996 |
| JP | H10-156628 A | 6/1998 |
| JP | 2008-260081 A | 10/2008 |
| JP | 2010-023138 A | 2/2010 |
| JP | 2015-077670 A | 4/2015 |

OTHER PUBLICATIONS

The extended European search report issued by the European Patent Office dated Nov. 28, 2019, which corresponds to EP19180823.7-1019 and is related to U.S. Appl. No. 16/437,145.

* cited by examiner

CONTROL DEVICE FOR WIRE ELECTRIC DISCHARGE MACHINE

This application is based on and claims the benefit of priority from Japanese Patent Application No. 2018-124900, filed on 29 Jun. 2018, the content of which is incorporated herein by reference.

BACKGROUND OF THE INVENTION

Field of the Invention

The present invention relates to a control device for a wire electric discharge machine.

Related Art

Conventionally, wire electric discharge machining has been known as one type of electric discharge machining. In wire electric discharge machining, machining of a contour shape is performed on a workpiece by causing a discharge phenomenon to occur between a wire electrode having conductivity and a workpiece.

The wire electric discharge machine performing such wire electric discharge machining performs electric discharge machining on a workpiece by relatively moving a wire electrode and workpiece based on a machining program. The wire electric discharge machine repeatedly performs machining processes of a plurality of electric discharge machining from rough machining until finish machining. The wire electric discharge machine creates a machining path offsetting by an offset value from a program shape (machined shape) of a workpiece based on the machining program in each machining process, in which the offset value differs in each machining process. The wire electric discharge machine causes the wire electrode and workpiece to relatively move along a machining path in each machining process.

Figure 3:
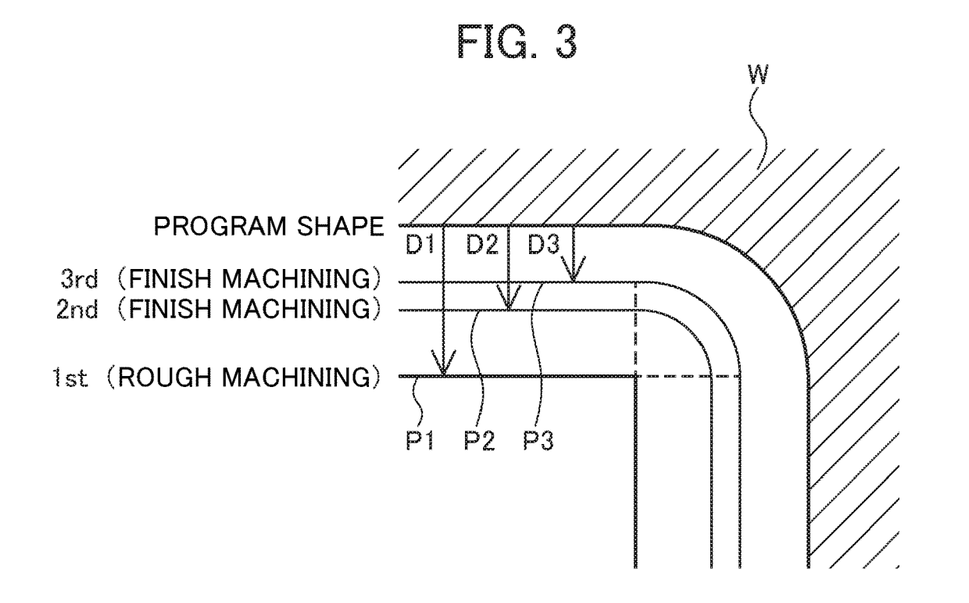
FIG. 3 is a view showing a concentric circle machining path in which the machining path of a corner part in a plurality of machining processes from rough machining until finish machining is a concentric circle shape.

For example, as shown in FIG. 3, the wire electric discharge machine creates a machining path P1 offsetting by an offset value D1 from the program, shape in the rough machining ($1^{st}$) process; creates a machining path P2 offsetting by an offset value D2 (D2<D1) from the program shape in a finish machining ($2^{nd}$) process, and creates a machining path P3 offsetting by an offset value D3 (D3<D2) from the program shape in a finish machining ($3^{rd}$) process. In addition, the wire electric discharge machine configures so that the shape of a corner part becomes a concentric circular shape, i.e. non-identical radius shape, in the machining paths P1, P2 and P3. In other words, the wire electric discharge machine creates the machining paths P1, P2 and P3, in which the shapes of corner parts are concentric circle (non-identical radius) shapes.

In this case, since the radius of the corner part becomes smaller from the final finish machining towards rough machining, there is a restriction in the minimum radius of the corner part in the final finish machining. In addition, as shown in FIG. 3, in the case of the radius of the corner part of the final finish machining being small, if avoiding overcutting (interference) in the rough machining, there will no longer be a circular arc shape in the corner part of the machining path. Then, the transit time of the wire electrode per unit length of the corner part of the machining path in rough machining becomes longer, and the machining precision of the corner part declines.

Figure 4:
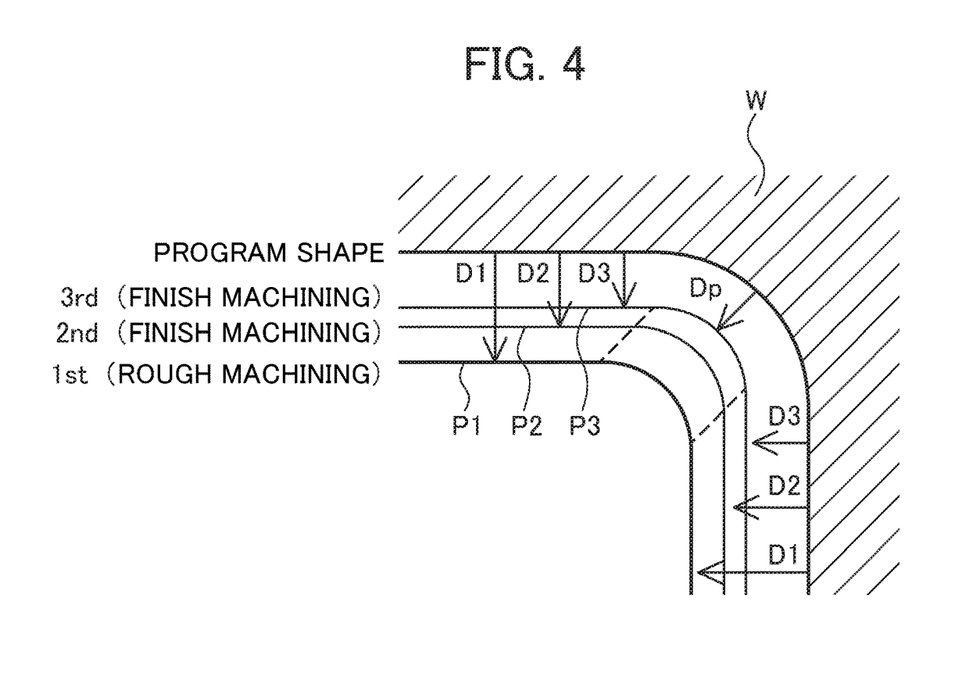
FIG. 4 is a view showing an identical circular arc machining path in which the machining path of corner parts in a plurality of machining processes from rough machining until finish machining is an identical circular arc shape.

Concerning this point, Patent Document 1 discloses wire electric discharge machining technology which creates a machining path so that the shape of the corner part becomes identical circular arc (identical radius) shapes, in a plurality of machining processes from rough machining until finish machining (See FIG. 4).

According to this, since the radius is identical from the final finish machining to rough machining, it is possible to make the smallest radius in final finish machining. In addition, as shown in FIG. 4, even if the radius of the corner part of the final finish machining is small, there will be a circular arc shape in the corner part of the machining path in rough machining. For this reason, the transit time of the wire electrode per unit length of the corner part in the machining path of rough machining will not become longer, and overcutting (interference) in the corner part of the program shape will not occur. For this reason, a decline in machining precision of the corner part is suppressed.

Patent Document 1: Japanese Unexamined Patent Application, Publication No. H07-009261
Patent Document 2: Japanese Unexamined Patent Application, Publication No. H04-217426
Patent Document 3: Japanese Unexamined Patent Application, Publication No. H08-168925

SUMMARY OF THE INVENTION

However, the present inventors have found that overcutting (interference) in the corner part of the program shape occurs according to the machined shape, also in machining by the machining path of identical circular arc shape, and the machining precision of the corner part declines.

Patent Document 1 neither discloses nor suggests that the machining precision of the corner part may decline also in machining according to the machining path of an identical circular arc shape. For this reason, Patent Document 1 discloses being able to switch between machining according to the machining path of identical circular arc shapes and machining according to the machining path of concentric circle shapes; however, it neither discloses nor suggests which should be selected under what conditions.

The present invention has an object of providing a control device for a wire electric discharge machine which suppresses a decline in the machining precision of corner parts.

(a) A control device (for example, the control device 20 described later) for a wire electric discharge machine according to the present invention which repeatedly performs a plurality of machining processes causing a wire electrode (for example, the wire electrode 5 described later) and workpiece to relatively move and perform electric discharge machining on the workpiece by following a machining path offsetting by an offset value from a machined shape of the workpiece, in which the offset value differs for the plurality of machining processes, the control device including: a shape analysis portion (for example, the shape analysis portion 21 described later) which looks ahead a machining program, and analyzes a machined shape of the workpiece; an identical circular arc shape machining path creation portion (for example, the identical circular arc shape machining path creation portion 23 described later) which creates, as machining paths for the plurality of machining processes, a plurality of machining paths of identical circular arc shape offsetting by an offset value from a machined shape analyzed by the shape analysis portion, wherein the offset value differs for the plurality of machining paths, and shape of a corner part are identical circular arc shape; a concentric circle shape machining path creation portion (for example, the concentric circle shape machining path creation portion 24 described later) which creates, as machining paths for the plurality of machining processes, a plurality of machining paths of concentric circle shape offsetting by an offset value from a machined shape analyzed by the shape analysis portion, wherein the offset value differs for the plurality of machining paths, and shape of a corner part are concentric circle shape; and a machining path selection portion (for example, the machining path selection portion 25 described later) which selects either of the plurality of machining paths of identical circular arc shape and the plurality of machining paths of concentric circle shape, as the machining paths for the plurality of machining processes, based on at least one among the machining program, the machined shape analyzed by the shape analysis portion, the plurality of machining paths of identical circular arc shape, and the plurality of machining paths of concentric circle shape.

(b) In the control device for the wire electric discharge machine described in (a), the machining path selection portion may select either of the plurality of machining paths of identical circular arc shape and the plurality of machining paths of concentric circle shape, based on at least one among a circular arc radius and circular arc center angle of a corner part of the machined shape analyzed by the shape analysis portion, and an angle between blocks before and after a corner part and the corner part in the machined shape analyzed by the shape analysis portion.

(c) In the control device for the wire electric discharge machine described in (b), the machining path selection portion may select the plurality of machining paths of concentric circle shape in a case of no satisfying at least one among conditions (1) to (3) below:
(1) circular arc radius of the corner part is no more than a predetermined value;
(2) circular arc center angle of the corner part is less than 180 degrees; and
(3) angle formed by linear blocks before and after circular arc of the corner part is no less than 45 degrees and no more than 135 degrees.

(d) In the control device for the wire electric discharge machine described in (c), the machining path selection portion may select the plurality of machining paths of identical circular arc shape, in a case of satisfying all of the conditions (1) to (3).

(e) The control device for the wire electric discharge machine described in any one of (a) to (d) may further include: a display portion which displays information of at least one among the machining program, the machined shape analyzed by the shape analysis portion, the plurality of machining paths of identical circular arc shape, and the plurality of machining paths of concentric circle shape, in which the machining path selection portion may select either of the plurality of machining paths of identical circular arc shape and the plurality of machining paths of concentric circle shape, based on an external command set based on the information displayed on the display portion.

According to the present invention, it is possible to suppress a decline in the machining precision of corner parts.

DETAILED DESCRIPTION OF THE INVENTION

Hereinafter, an example of an embodiment of the present invention will be explained by referencing the attached drawings. It should be noted that the same reference symbols are attached to identical or corresponding portions in each drawing.

Figure 1:
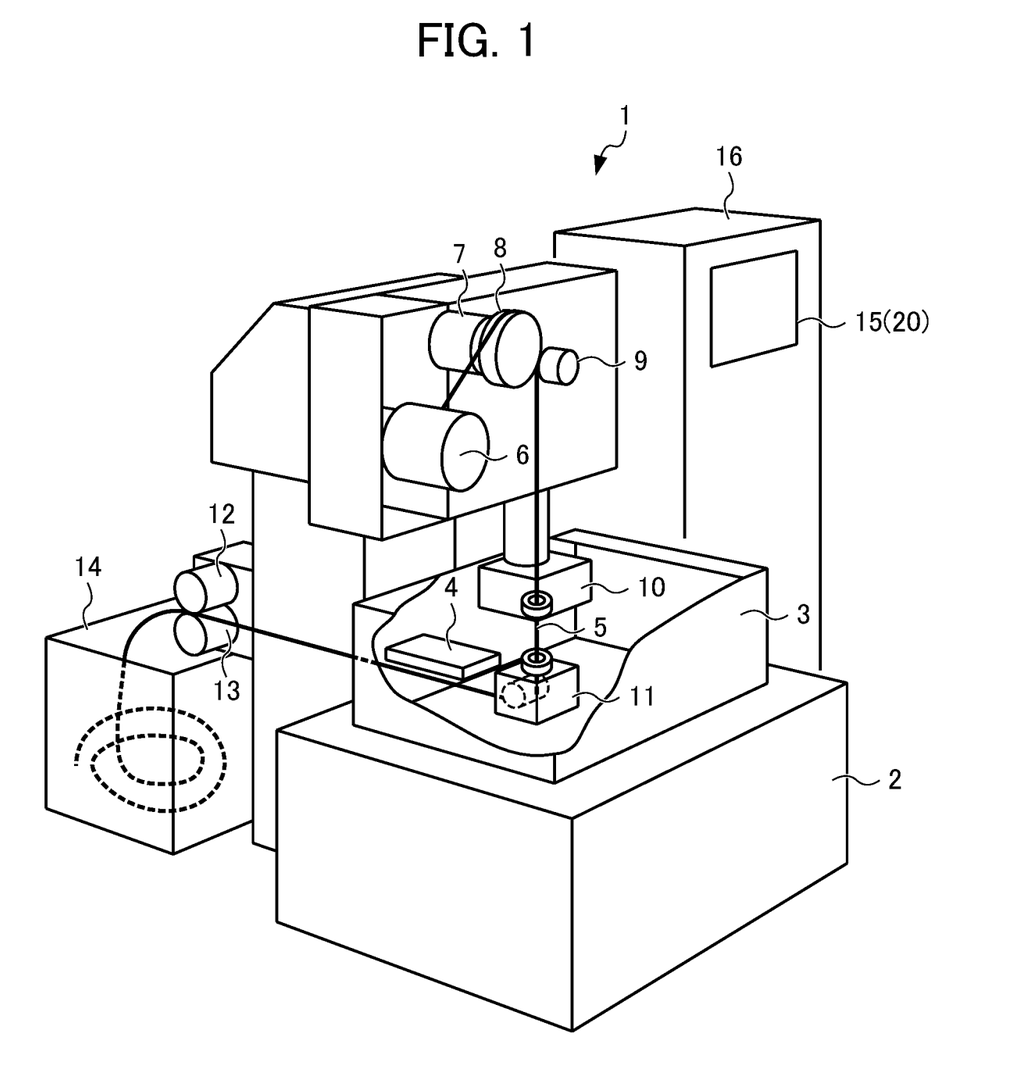
FIG. 1 is an outline perspective view showing a wire electric discharge machine according to the present embodiment.

FIG. 1 is an outline perspective view showing a wire electric discharge machine according to the present embodiment. The wire electric discharge machine 1 shown in FIG. 1 performs electric discharge machining on a workpiece by causing the wire electrode and workpiece (machined object) to relatively move based on a machining program. The wire electric discharge machine 1 repeatedly performs machining processes of a plurality of electric discharge machining from rough machining until finish machining. The wire electric discharge machine 1 creates a machining path (also referred as wire diameter compensation path) offsetting by an offset value (including wire diameter compensation value) from the program shape (machined shape) of a workpiece based on the machining program in each machining process, which is a machining path in which the offset value differs in each machining process. The wire electric discharge machine 1 causes the wire electrode and workpiece to relatively move according to the machining path, in each machining process.

The wire electric discharge machine 1 includes a bed 2, a work tank 3, a work table 4, a wire electrode 5, a wire bobbin 6, a motor/powder brake 7, a brake roller 8, a pinch roller 9, an upper guide 10, a lower guide 11, a pinch roller 12, a feed roller 13, a wire recovery box 14, CMC (numerical control device) 15, a machining power supply 16, and a control device 20 for a wire electric discharge machine according to the present embodiment.

The bed 2 is a machine stand on which the work tank 3 is placed. The work tank 3 is a space for performing electric discharge machining in which dielectric working fluid is filled. The work table 4 is a stand on which the workpiece W is placed, and is determined by the relative position with the wire electrode 5 being controlled by the CNC 15 and control device 20.

The wire electrode 5 is drawn from the wire bobbin 6, and is recovered by the wire recovery box 14 by passing through the brake roller 8 which is driven by the motor/powder brake 7, the pinch roller 9, upper guide 10, lower guide 11, pinch roller 12 and feed roller 13. This wire electrode 5 is supported by the upper guide 10 and lower guide 11 within the work tank 3, and is stretched linearly between the upper guide 10 and lower guide 11. This linearly stretched wire electrode 5 performs electric discharge machining on the workpiece W in a state immersed in the dielectric working fluid.

With the wire bobbin 6, a predetermined torque is applied in the reverse direction from the drawing direction of the wire electrode 5, by a torque motor which is not illustrated. The positions of the upper guide 10 and lower guide 11 are fixed or variable, depending on the shape and/or fixing method of the workpiece W, and a program according to the shape machined into the workpiece W. The machining power supply 16 makes electric discharge machining on the workpiece W possible by applying high-frequency voltage to the wire electrode 5.

The control device 20 performs change control of the machining path of the wire electric discharge machine 1. More specifically, the control device 20 normally controls so as to select the machining paths of identical circular arc shape in which the shape of the corner part are identical circular arc (identical radius) shape, as described later. However, when a defect arises in the machining according to the machining path of concentric circle shape, the control device 20 controls so as to select the machining paths of concentric circle shape in which the shape of corner part are concentric circle (non-identical radius) shape. The control device 20 may be provided to the wire electric discharge machine 1 or CNC 15, or may be provided to a computer which is separate from these.

Figure 2:
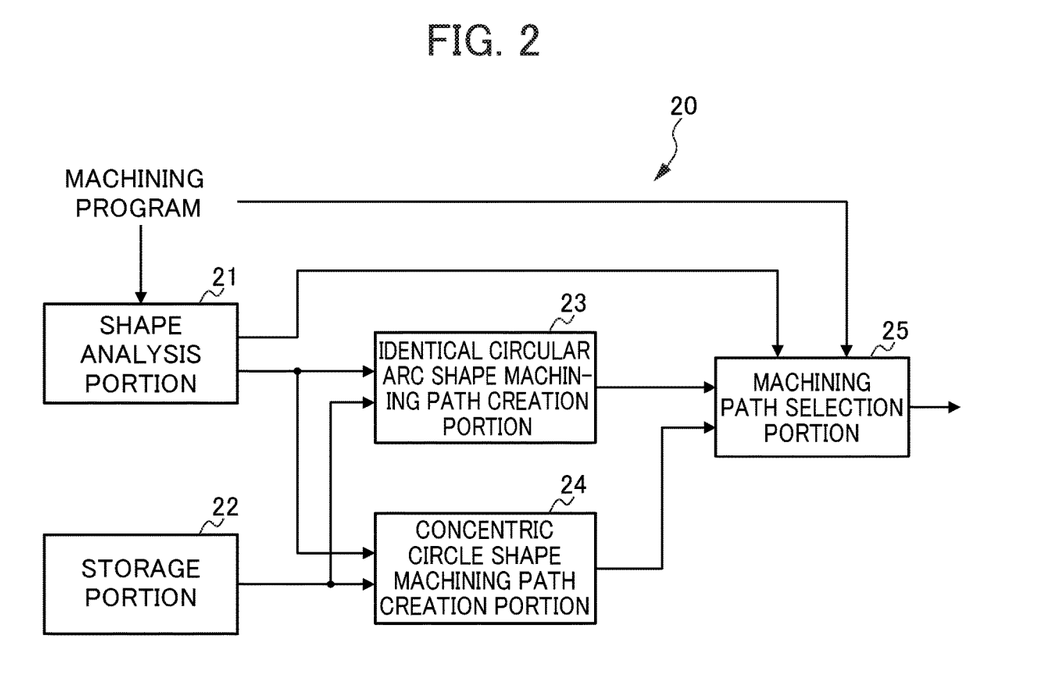
FIG. 2 is a view showing the configuration of a control device for a wire electric discharge machine according to the present embodiment.

FIG. 2 is a view showing a control device for a wire electric discharge machine according to the present embodiment. The control device 20 shown in FIG. 2 includes a shape analysis portion 21, storage portion 22, identical circular arc shape machining path creation portion 23, concentric circle shape machining path creation portion 24, and machining path selection portion 25.

The control device 20 (excluding storage portion 22), for example, is configured by an arithmetic processor such as DSP (Digital Signal Processor), and FPGA (Field-Programmable Gate Array), for example. Various functions of the control device 20 are realized by executing predetermined software (programs, applications) stored in the storage portion 22, for example. Various functions of the control device 20 may be realized by cooperation between hardware and software, or may be realized by only hardware (electronic circuits).

The shape analysis portion 21 looks ahead a machining program supplied from the CNC 15, and analyzes program shape (machining shape) of the workpiece.

The storage portion 22 stores offset values D1, D2, D3, Dp of a plurality of machining processes from rough machining until finish machining. The offset value is set to a value which considers the wire diameter (radius) of the wire electrode 5, electric discharge distance, etc. The storage portion 22 is re-writable memory such as EEPROM, for example.

The identical circular arc shape machining path creation portion 23 creates machining paths offsetting by the offset value stored in the storage portion 22, from the program shape analyzed by the shape analysis portion 21. The identical circular arc shape machining path creation portion 23 creates machining paths having different offset values in each of the plurality of machining processes from the rough machining until finish machining.

In the example of FIG. 4, the identical circular arc shape machining path creation portion 23 creates a machining path P1 offsetting by an offset value D1 from the program shape in the rough machining ($1^{st}$) process, creates a machining path P2 offsetting by an offset value D2 (D2<D1) from the program shape in the finish machining ($2^{nd}$) process, and creates a machining process P3 offsetting by an offset value D3 (D3<D2) from the program shape in the finish machining ($3^{rd}$) process.

Herein, the offset value is a value considering the wire diameter (radius) of the wire electrode 5, and the machining path is a path through which the center of the wire electrode 5 passes. The machining path offsetting by the offset value from the program shape is thereby also referred to as wire diameter compensation path.

In addition, the identical circular arc shape machining path creation portion 23 configures so that the shape of the corner part becomes identical circular arc shape, i.e. identical radius shape, in the machining paths P1, P2 and P3. In other words, the identical circular arc shape machining path creation portion 23 creates the machining paths P1, P2, and P3 in which the shape of the corner part are identical circular arc (identical radius) shape.

The concentric circle shape machining path creation portion 24 creates machining paths offsetting by an offset value stored in the storage portion 22, from the program shape analyzed by the shape analysis portion 21, similarly to the identical circular arc shape machining path creation portion 23. The concentric circle shape machining path creation portion 24 creates machining paths having different offset values for each of the plurality of machining processes from rough machining until finish machining.

In the example of FIG. 3, the concentric circle shape machining path creation portion 24 creates a machining path P1 offsetting by an offset value D1 from the program, shape in the rough machining ($1^{st}$) process, creates a machining path P2 offsetting by an offset value D2 (D2<D1) from the program shape in the finish machining ($2^{nd}$) process, and creates a machining process P3 offsetting by an offset value D3 (D3<D2) from the program shape in the finish machining ($3^{rd}$) process.

In addition, the concentric circle shape machining path creation portion 24 configures so that the shape of corner part becomes concentric circle shape, i.e. non-identical radius shape, in the machining paths P1, P2 and P3. In other words, the concentric circle shape machining path creation portion 24 differs from the identical circular arc shape machining path creation portion 23, in creating the machining paths P1, P2 and P3, in which the shape of corner part are concentric circle (non-identical radius) shape.

Herein, it is preferable to use a machining path of identical circular arc shape as the machining path. However, the present inventors found that it is not possible to apply machining path of identical circular arc shape to the overall program shape.

Figure 5:
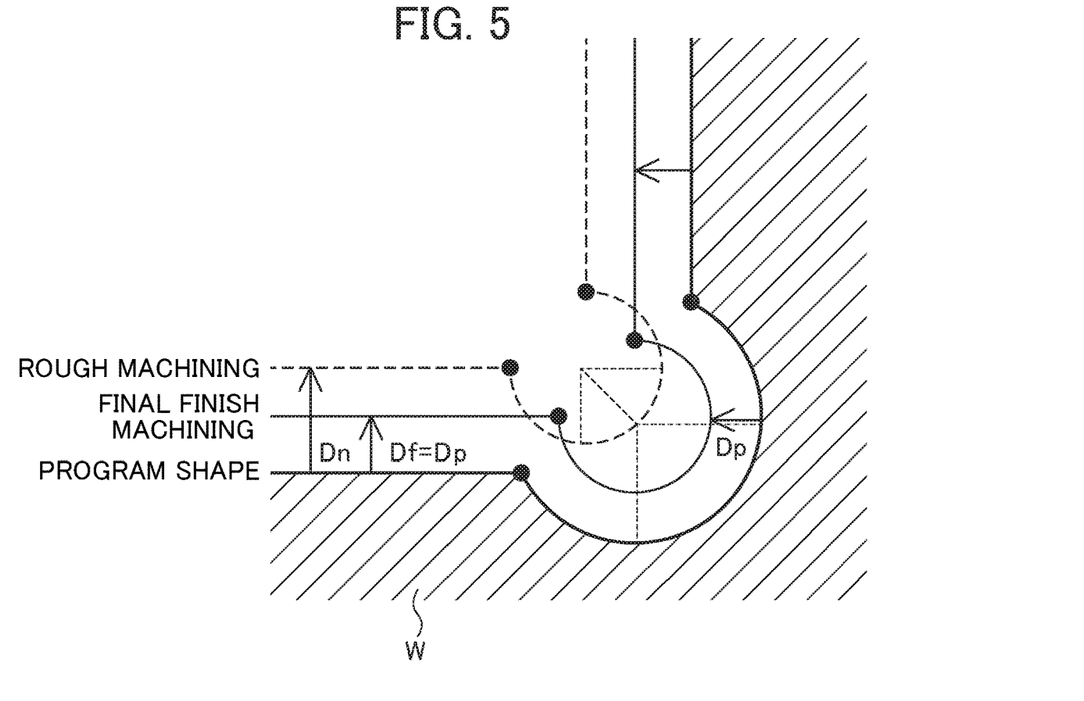
FIG. 5 is a view showing a problem in machining according to an identical circular arc machining path.

For example, in the machining according to the machining paths of identical circular arc shape created by the identical circular arc shape machining path creation portion 23, overcutting (interference) may occur according to the machining shape. For example, in the case of accompanying relief machining at the corner part as shown in FIG. 5, in the machining paths of the identical circular arc shape, the machining path of the rough machining (dotted line: offset value Dn) interferes with the machining path of the final finish machining (solid line: offset value Df=corner part offset value Dp), and is overcut more than the program shape in rough machining.

Figure 6:
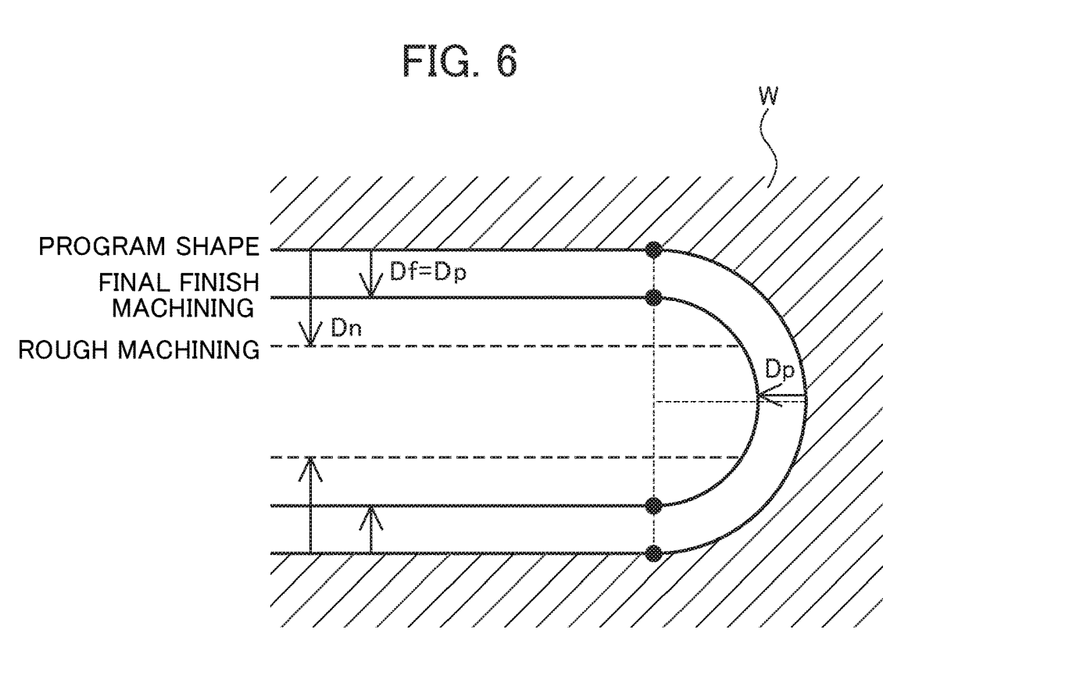
FIG. 6 is a view showing another problem in machining according to an identical circular arc machining path.

In addition, according to the machining shape, the identical circular arc shape machining path creation portion 23 may not be able to create the machining paths of the identical circular arc shape. For example, in a case of the blocks before and after the circular arc corner part being a parallel linear shape as in FIG. 6, in the corner part of the machining path of rough machining (dotted line: offset value Dn), it is not possible to create an circular arc shape (identical radius shape) identical to the corner part of the machining path of the final finish machining (solid line: offset value Df=corner part offset value Dp). If creating a path of the identical circular arc radius at the intersection of the solid line with the dotted line, the circular arc path becomes short, and the machining precision of the corner part worsens. In addition, overcutting (interference) may occur.

Therefore, the machining path selection portion 25 selects, as the machining paths, either of a plurality of machining paths of identical circular arc shape or a plurality of machining paths of concentric circle shape, based on at least one among the machining program, program shape analyzed by the shape analysis portion 21, the plurality of machining paths of identical circular arc shape, and the plurality of machining paths of concentric circle shape.

For example, the machining path selection portion 25 selects either of the plurality of machining paths of identical circular arc shape or the plurality of machining paths of concentric circle shape, based on at least one among the circular arc radius and circular arc central angle of the corner part in the program shape, and angle formed by the blocks before and after the corner part and corner part of the program shape.

Alternatively, for example, the machining path selection portion 25 selects either of the plurality of machining paths of identical circular arc shape or the plurality of machining paths of concentric circle shape, based on at least one among the circular arc radius and circular arc center angle of the corner part of any among the plurality of machining paths of identical circular arc shape, and the angle formed by the blocks before and after the corner part and the corner part of any among the plurality of machining paths of identical circular arc shape.

Alternatively, for example, the machining path selection portion 25 selects either of the plurality of machining paths of identical circular arc shape or the plurality of machining paths of concentric circle shape, based on at least one among the circular arc radius and circular arc center angle of the corner part in the final finish machining path among the plurality of machining paths of concentric circle shape, and the angle formed by the blocks before and after the corner-part and the corner part of the final finish machining path among the plurality of machining paths of concentric circle shape.

For example, in the case of satisfying all of the following conditions, the machining path selection portion 25 selects the plurality of machining paths of identical circular arc shape since the above-mentioned problems in machining according to the plurality of machining path of identical circular arc shape will not occur. On the other hand, in the case of not satisfying at least one among the following conditions, since the above-mentioned problem occurs in the machining according to the plurality of machining paths of identical circular arc shape, the machining path selection portion 25 selects the plurality of machining paths of concentric circle shape.

(Machining Program Related Conditions)
Including circular arc block (G02/G03, corner R)
Not including relief machining command (R-0)
Not including wire diameter compensation command (G41, G42: startup) and cancel command (G40) in circular arc block
Not including wire diameter compensation command (G40, G41, G42) in blocks before and after circular arc block (Program Shape Related Conditions)
Radius of circular arc block (circular arc radius of corner part) is no more than predetermined value (e.g., 1.0 mm) (corresponding to condition (1) in Claims)
Herein, the predetermined value may be set to the smallest radius of the program shape, at which rough machining is possible also in the conventional machining path of concentric circle shape. In this case, there is no relief machining in the corner part.

The center angle of the circular arc block (circular arc center angle of corner part) is less than 180 degrees, preferably the center angle of the circular arc block is no less than 45 degrees and no more than 135 degrees (corresponding to condition (2) in the Claims)
In this case, the before and after blocks of the circular arc corner part are not parallel linear shapes Angle formed by linear blocks before and after circular arc block is no less than 45 degrees and no more than 135 degrees (corresponding to condition (3) in the Claims)
In this case, the blocks before and after the circular arc corner part are not parallel linear shapes.

In addition, a condition may be added of the circular arc block connecting with the before and after blocks, i.e. angle formed by blocks before and after corner part and the corner part being no less than about 180 degrees (180±1~5 degrees). In this case, there is no relief machining in the corner part.

(Machining Path-related Conditions of Identical Circular Arc Shape and Concentric Circle Shape)
Radius of circular arc block (circular arc radius of corner part) is no more than predetermined value (e.g., 1.0 mm) (corresponding to condition (1) in the Claims)
Herein, the predetermined value may be set to the smallest radius of the program shape, at which rough machining is possible also in the conventional machining path of concentric circle shape. In this case, there is no relief machining in the corner part.

Center angle of circular arc block (circular arc center angle of corner part) is less than 180 degrees, preferably the center angle of circular arc block is no less than 45 degrees and no more than 135 degrees (corresponding to condition (2) in the Claims)

Angle formed by linear blocks before and after circular arc block is no less than 45 degrees and no more than 135 degrees (corresponding to condition (3) in the Claims)
In this case, the blocks before and after the circular arc corner part are not parallel linear shapes.

Radius of circular arc block of machining path of identical circular arc shapes is greater than 0
Offset direction and offset value of machining path are identical in circular arc block and blocks before and after this In addition, a condition may be added of the circular arc block contacting with before and after blocks, i.e. angle formed by blocks before and after corner part and the corner part is no less than about 180 degrees (180±1~5 degrees). In this case, there is no relief machining in the corner part.

As explained above, according to the control device 20 for the wire electric discharge machine of the present embodiment, it is automatically possible to properly use machining according to the machining paths of identical circular arc (identical radius) shape, and machining according to the machining paths of concentric circle (non-identical radius) shape. For example, the control device 20 controls so as to select the machining paths of identical circular arc (identical radius) shape, and if a defect arises in the machining according to the machining paths of the concentric circle shape, can control so as to select the machining paths of concentric circle (non-identical radius) shape. It is thereby possible to suppress a decline in the machining precision of the corner part.

It should be noted that, in order to properly use the machining according to the machining paths of identical circular arc (identical radius) shape, and machining according to the machining paths of concentric circle (non-identical radius) shape automatically, it has been considered to compensate the program so as to specify according to which machining path to apply machining in a block (for example, G code, M code or the like). In addition, in order to compensate the program, it has been considered to prepare dedicated CAM. However, according to the control device 20 for the wire electric discharge machine of the present embodiment, it is possible to properly use the machining according to the machining paths of identical circular arc (identical radius) shape and the machining according to the machining paths of concentric circle (non-identical radius) shape, automatically without compensating the program.

Although an embodiment of the present invention has been explained above, the present invention is not to be limited to the aforementioned embodiment, and various changes and modifications thereto are possible. For example, in the aforementioned embodiment, although selection between the machining paths of identical circular arc shape and the machining paths of concentric circle shape was performed automatically, the selection between the machining paths of identical circular arc shape and the machining paths of concentric circle shape may be performed manually.

Figure 7:
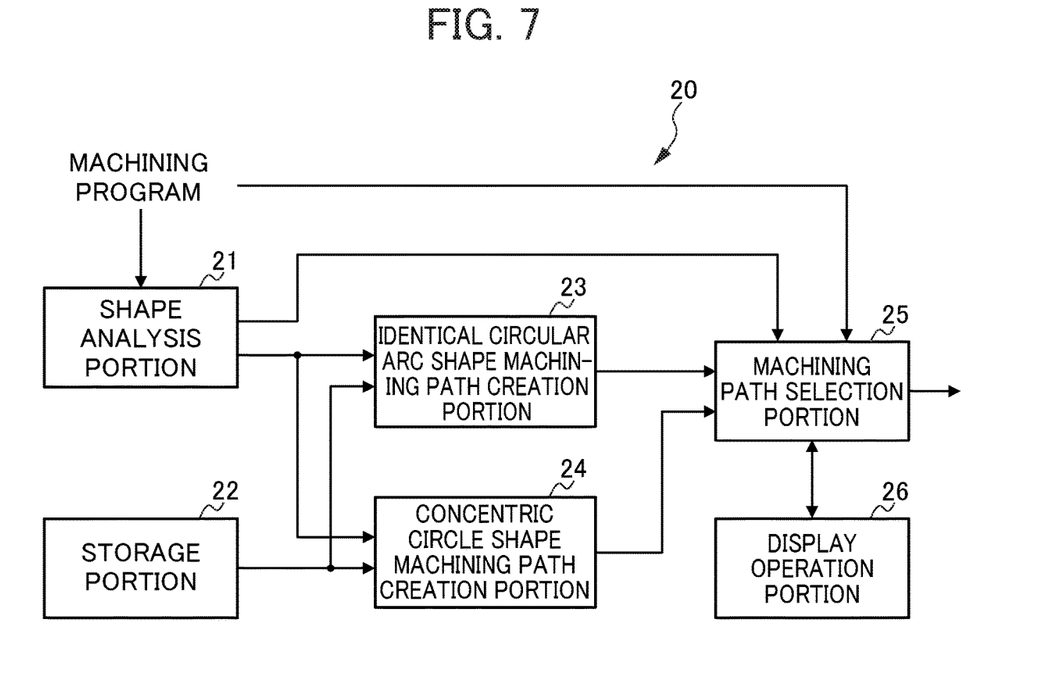
FIG. 7 is a view showing the configuration of a control device for a wire electric discharge machine according to a modified example of the present embodiment.

In this case, as shown in FIG. 7, the control device 20 for the wire electric discharge machine further includes a display operation portion 26 which displays at least one set of information among the machining program, the program shape (machined shape) analyzed by the shape analysis portion 21, and the plurality of machining paths of identical circular arc shape and the plurality of machining paths of concentric circle shape. In FIG. 7, the display operation portion 26 acquires the aforementioned information via the machining path selection portion 25; however, it may directly acquire from the CNC 15, shape analysis portion 21, identical circular arc shape machining path creation portion 23 and concentric circle shape machining path creation portion 24.

The operator can thereby confirm whether or not satisfying all of the above-mentioned conditions according to the information displayed on the display operation portion 26. In other words, the operator can confirm whether or not it is possible to apply the machining paths of the identical circular arc (identical radius) shape to the entire program shape. The operator sets in the control device 20 via the display operation portion 26 a command related to which to select among the machining paths of identical circular arc shape and the machining paths of concentric circle shape, based on the results of the confirmation. The machining path selection portion 25 selects, as the machining paths, either of the plurality of machining paths of identical circular arc shape and the plurality of machining paths of concentric circle shape, based on an external command set based on information displayed on the display operation portion 26.

It is thereby possible to properly use the machining according to the machining paths of identical circular arc (identical radius) shape and machining according to the machining paths of concentric circle (non-identical radius) shape. It is thereby possible to suppress a decline in the machining precision of the corner part.

In addition, although machining of an inner corner part has been explained in the aforementioned embodiment, the features of the present invention are also applicable to machining of an outer corner part.

EXPLANATION OF REFERENCE NUMERALS 1 wire electric discharge machine
2 bed
3 work tank
4 work table
5 wire electrode
6 wire bobbin
7 motor/powder brake
8 brake roller
9 pinch roller
10 upper guide
11 lower guide
12 pinch roller
13 feed roller
14 wire recovery box
15 CNC (numerical control device)
16 machining power source
20 control device for wire electric discharge machine
21 shape analysis portion
22 storage portion
23 identical circular arc shape machining path creation portion
24 concentric circle shape machining path creation portion
25 machining path selection portion
26 display operation portion

What is claimed is:

1. A control device for a wire electric discharge machine which repeatedly performs a plurality of machining processes causing a wire electrode and workpiece to relatively move and perform electric discharge machining on the workpiece by following a machining path offsetting by an offset value from a machined shape of the workpiece, wherein the offset value differs for the plurality of machining processes, the control device comprising a processor, the processor being configured to:
  look ahead a machining program and analyze a machined shape of the workpiece;
  create, as machining paths for the plurality of machining processes, a plurality of macnining paths of identical circular arc shape offsetting by an offset value from the analyzed machined shape wherein the offset value differs for each of the plurality of machining paths, and a shape of a corner part of each of the plurality of machine paths is an identical circular arc shape;
  create, as machining paths for the plurality of machining processes, a plurality of machining paths of concentric circle shape offsetting by an offset value from the analyzed machined shape wherein the offset value differs for each of the plurality of machining paths, and shape of a corner part of each of the plurality of machining paths is a concentric circle shape; and
  select either of the plurality of machining paths if identical circular arc shape and the plurality of machining paths of concentric circle shape, as the machining paths for the plurality of machining processes, based on at least one among the machining program, the analyzed machined shape, the plurality of machining paths of identical circular arc shape, and the plurality of machining paths of concentric circle shape.

2. The control device for the wire electric discharge machine according to claim 1, wherein the processor selects either of the plurality of machining paths of identical circular arc shape and the plurality of machining paths of concentric circle shape, based on at least one among an circular arc radius and circular arc center angle of a corner part of the analyzed machined shape, and an angle between blocks before and after a corner part and the corner part in the analyzed machined shape.

3. The control device for the wire electric discharge machine according to claim 2, wherein the processor selects the plurality of machining paths of concentric circle shape in a case of no satisfying at least one among conditions (1) to (3) below:
 (1) circular arc radius of the corner part is no more than a predetermined value;
 (2) circular arc center angle of the corner part is less than 180 degrees; and
 (3) angle formed by linear blocks before and after circular arc of the corner part is no less than 45 degrees and no more than 135 degrees.

4. The control device for the wire electric discharge machine according to claim 3, wherein the processor selects the plurality of machining paths of identical circular arc shape, in a case of satisfying all of the conditions (1) to (3).

5. The control device for the wire electric discharge machine according to claim 1, further comprising a display which displays information of at least one among the machining program, the analyzed machined shape, the plurality of machining paths of identical circular arc shape, and the plurality of machining paths of concentric circle shape,
 wherein the processor selects either of the plurality of machining paths of identical circular arc shape and the plurality of machining paths of concentric circle shape, based on an external command set based on the information displayed on the display.

* * * * *